US011130699B2

(12) United States Patent
Hurley

(10) Patent No.: US 11,130,699 B2
(45) Date of Patent: Sep. 28, 2021

(54) HIGH STRENGTH GLASS SPHEROIDS

(71) Applicant: William J. Hurley, Kiowa, CO (US)

(72) Inventor: William J. Hurley, Kiowa, CO (US)

(*) Notice: Subject to any disclaimer, the term of this patent is extended or adjusted under 35 U.S.C. 154(b) by 81 days.

(21) Appl. No.: 16/156,602

(22) Filed: Oct. 10, 2018

(65) Prior Publication Data

US 2019/0106350 A1 Apr. 11, 2019

Related U.S. Application Data

(60) Provisional application No. 62/570,295, filed on Oct. 10, 2017.

(51) Int. Cl.
*C03B 27/02* (2006.01)
*C03B 13/14* (2006.01)
*C03B 19/10* (2006.01)

(52) U.S. Cl.
CPC ............ *C03B 27/028* (2013.01); *C03B 13/14* (2013.01); *C03B 19/101* (2013.01); *C03B 19/104* (2013.01); *C03B 19/1045* (2013.01); *C03B 19/1095* (2013.01); *C03B 27/022* (2013.01)

(58) Field of Classification Search
CPC ..... C03B 19/10; C03B 19/104; C03B 19/109; C03B 19/1095; C03B 27/02–27/035; C03B 27/06–27/067
See application file for complete search history.

(56) References Cited

U.S. PATENT DOCUMENTS 2,963,824 A * 12/1960 Pinotti .................. C03B 19/104
65/21.2
3,242,032 A * 3/1966 Schott ................. C03B 19/1005
428/402
3,389,982 A * 6/1968 Schott ..................... C03B 27/02
65/21.3
3,491,423 A * 1/1970 Haller ..................... F16C 33/32
384/491
3,506,421 A * 4/1970 Weber ................... C03B 19/104
65/21.2
3,658,500 A * 4/1972 Hagenbach ......... C03B 19/1005
65/21.3
3,843,340 A * 10/1974 Cone ..................... C03B 5/0336
65/21.2
4,002,446 A * 1/1977 Hammel ............. C03B 19/1095
65/21.2

(Continued)

FOREIGN PATENT DOCUMENTS

CN 100999376 6/2010
JP 2000159529 A * 6/2000 ......... C03B 19/1055

(Continued)

OTHER PUBLICATIONS

English language machine translation of JP 2013-170116 (Year: 2013).*

(Continued)

*Primary Examiner* — Jason L Lazorcik
(74) *Attorney, Agent, or Firm* — Morrison & Foerster LLP

(57) ABSTRACT

The present disclosure is directed to glass spheroids and methods of making these spheroids that have significantly increased resilience to applied pressure and surface scratching. In addition, the present disclosure is directed to tailless Prince Rupert's Drops and methods of making tailless Prince Rupert's Drops.

8 Claims, 6 Drawing Sheets

(56) References Cited

U.S. PATENT DOCUMENTS

| | | | |
|---|---|---|---|
| 4,063,916 A | 12/1977 | De Vos et al. | |
| 4,066,430 A * | 1/1978 | Franz | B29B 13/045 |
| | | | 65/116 |
| 4,201,560 A * | 5/1980 | Dewitte | C03B 5/14 |
| | | | 65/21.3 |
| 4,303,732 A | 12/1981 | Torobin | |
| 5,895,512 A * | 4/1999 | Dominitz | C03B 17/025 |
| | | | 65/59.6 |
| 2004/0016262 A1 | 1/2004 | Zandvliet et al. | |
| 2004/0168473 A1 | 9/2004 | Hiraka et al. | |
| 2006/0260361 A1 | 11/2006 | Yoshida et al. | |
| 2006/0269738 A1 | 11/2006 | Kimberly | |
| 2013/0014945 A1 * | 1/2013 | Fang | E21B 43/267 |
| | | | 166/280.1 |
| 2014/0220273 A1 | 8/2014 | Blaschke et al. | |
| 2020/0131086 A1 * | 4/2020 | Koike | C03C 3/085 |

FOREIGN PATENT DOCUMENTS

| | | | | |
|---|---|---|---|---|
| JP | 2001287918 A | * | 10/2001 | C03B 19/104 |
| JP | 2007063098 A | * | 3/2007 | C03B 19/104 |
| JP | 2013170116 A | * | 9/2013 | |

OTHER PUBLICATIONS

English language machine translation of JP 2007-63098 (Year: 2007).*

JP-2000159529—A English language machine translation accessed at ESP@CENET on Apr. 30, 2021.*

International Search Report and Written Opinion dated Feb. 27, 2019, directed to PCT Application No. PCT/US2018/55274; 34 pages.

Invitation to Pay Additional fees dated Dec. 14, 2018, directed to International Application No. PCT/US2018/55274; 2 pages.

* cited by examiner

Output from the model showing compressive and tensile stress in MPa of a spherical cross-section with a 5mm

HIGH STRENGTH GLASS SPHEROIDS

CROSS REFERENCE TO RELATED APPLICATION

This application claims the benefit of U.S. Provisional Application No. 62/570,295 filed Oct. 10, 2017, the contents of which are incorporated herein by reference.

FIELD OF DISCLOSURE

This disclosure relates to high strength glass spheroids. More particularly, this disclosure relates to high strength glass spheroids created by the elimination of the tail of a Prince Rupert's Drop.

BACKGROUND

Due to various new manufacturing processes, such as metal sintering and 3D printing, the thermal strain of a material is of increasing interest in various industries. Many attempts have been made to improve points of failure for various materials, but not nearly as much focus has been put towards strengthening internal strain of material.

A Prince Rupert's Drop is a special piece of tempered glass created by dropping a piece of molten glass into a tank of cooling fluid. Although sensitive to thermal shock, if cooled properly, extreme internal strain can be generated during the solidification. This gives the Prince Rupert's Drop its characteristics. While the inner layers are still molten and held in a thermally expanded state, the outer surface of the Drop cools and constricts creating compressive stress. Since the outer lay has hardened, the inner lays may not contract as it cools. This creates the internal tensile stress that, combined with the compressed surface, gives the bulbous end of a Prince Rupert's Drop an incredible amount of strength. However, a Prince Rupert's Drop can be inherently unstable due to the presence of a non-symmetric merging of the internal stresses, namely the tail. If the tail is damaged, the potential energy generated by the internal stresses can be released creating a fracture wave that propagates throughout the Drop. The rate of this fracture wave can be approximately 1660 m/s, which is comparable to the detonation front of chemical explosives.

Accordingly, there is a need to find a way to create spheroids that contain the benefits of the bulbous end of a Prince Rupert's Drop without the drawbacks of the tail of the Drop.

SUMMARY

Described herein are examples of spheres, spheroids, and ellipsoids and methods of making these spheres, spheroids, and ellipsoids that have significantly increased resilience to applied pressure and surface scratching. In addition, described herein are examples of Prince Rupert's Drops without a tail and methods of making Prince Rupert's Drops without a tail. Because the head or bulbous end of a Prince Rupert's Drop has great thermal stress characteristics, Applicants discovered that a Prince Rupert's Drop can be coupled with geometry to promote increased strength and durability (within the head of the drop).

In some embodiments, a method of making a glass spheroid comprises: melting spheroid material; adding the melted spheroid material to a heated channel; rolling the melted spheroid material back and forth on the heated channel into a molten bead comprising the melted spheroid material; and rolling the molten bead into a cooling environment comprising a cooling fluid, thereby forming a glass spheroid. In some embodiments, the spheroid material comprises soda-lime glass or borosilicate glass. In some embodiments, the spheroid material comprises borosilicate glass. In some embodiments, the heated channel is a hemispheric heated channel. In some embodiments, the heated channel comprises graphite, stainless steel, brass, or ceramic. In some embodiments, the heated channel comprises graphite. In some embodiments, the cooling fluid comprises water, salt water solutions, tempering oils, synthetic oils, or super-cooled liquids. In some embodiments, the cooling fluid comprises water. In some embodiments, the glass spheroid has a compressive strength of at least 250,000 psi. In some embodiments, the glass spheroid has a compressive strength between 250,000 psi and 550,000 psi.

In some embodiments, a method of making a glass spheroid comprises: adding molten spheroid material to a heated mold; applying a continuous pressure to the heated mold; and immersing the mold into a cooling environment comprising a cooling fluid, thereby forming a glass spheroid in the mold. In some embodiments, the spheroid material comprises soda-lime glass or borosilicate glass. In some embodiments, the spheroid material comprises borosilicate glass. In some embodiments, the heated mold is a two-piece mold. In some embodiments, the heated mold comprises graphite, stainless steel, brass, or ceramic. In some embodiments, the heated mold comprises graphite. In some embodiments, the cooling fluid comprises water, salt water solutions, tempering oils, synthetic oils, or super-cooled liquids. In some embodiments, the cooling fluid comprises water. In some embodiments, the glass spheroid has a compressive strength of at least 250,000 psi. In some embodiments, the glass spheroid has a compressive strength between 250,000 psi and 550,000 psi.

The term "spheroid" can be used to describe spherical shaped geometries including, but not limited to, spheres, spheroids, ellipsoids, and semi-spheres.

The average diameter can be measured by various techniques known to those of skill in the art. Unless stated to the contrary, the size of a particle refers to the average diameter.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION

Described herein are examples of spheres, spheroids, and ellipsoids and methods of making these spheres, spheroids, and ellipsoids that have significantly increased resilience to applied pressure and surface scratching. In addition, described herein are examples of Prince Rupert's Drops without a tail and methods of making Prince Rupert's Drops without a tail.

Model Simulation

In order to create a spherical Prince Rupert's Drop (or PRD), Applicants created a MatLab program that can reevaluate what was occurring during the cooling and solidification of the spheres during quenching. Utilizing documented glass standards (as shown in National Institute of Standards and Technology, Certificate S.R.M. 71 (L1, L2, L3) "Borosilicate Glass—Thermal Expansion which is hereby incorporated in its entirety by reference) on the non-linear thermal expansion and models used by the welding industry (as shown in Nur Syahroni and Mas Irfan Purbawanto Hidayat. "3D Finite Element Simulation of T-Joint Fillet Weld: Effect of Various Welding Sequences on the Residual Stress and Distortions" which is hereby incorporated in its entirety by reference) to evaluate strain in welding joints, an algorithm was created that helped map the cooling rate and stress in a glass sphere. This algorithm led to a better understanding of the tempering process.

Figure 1:
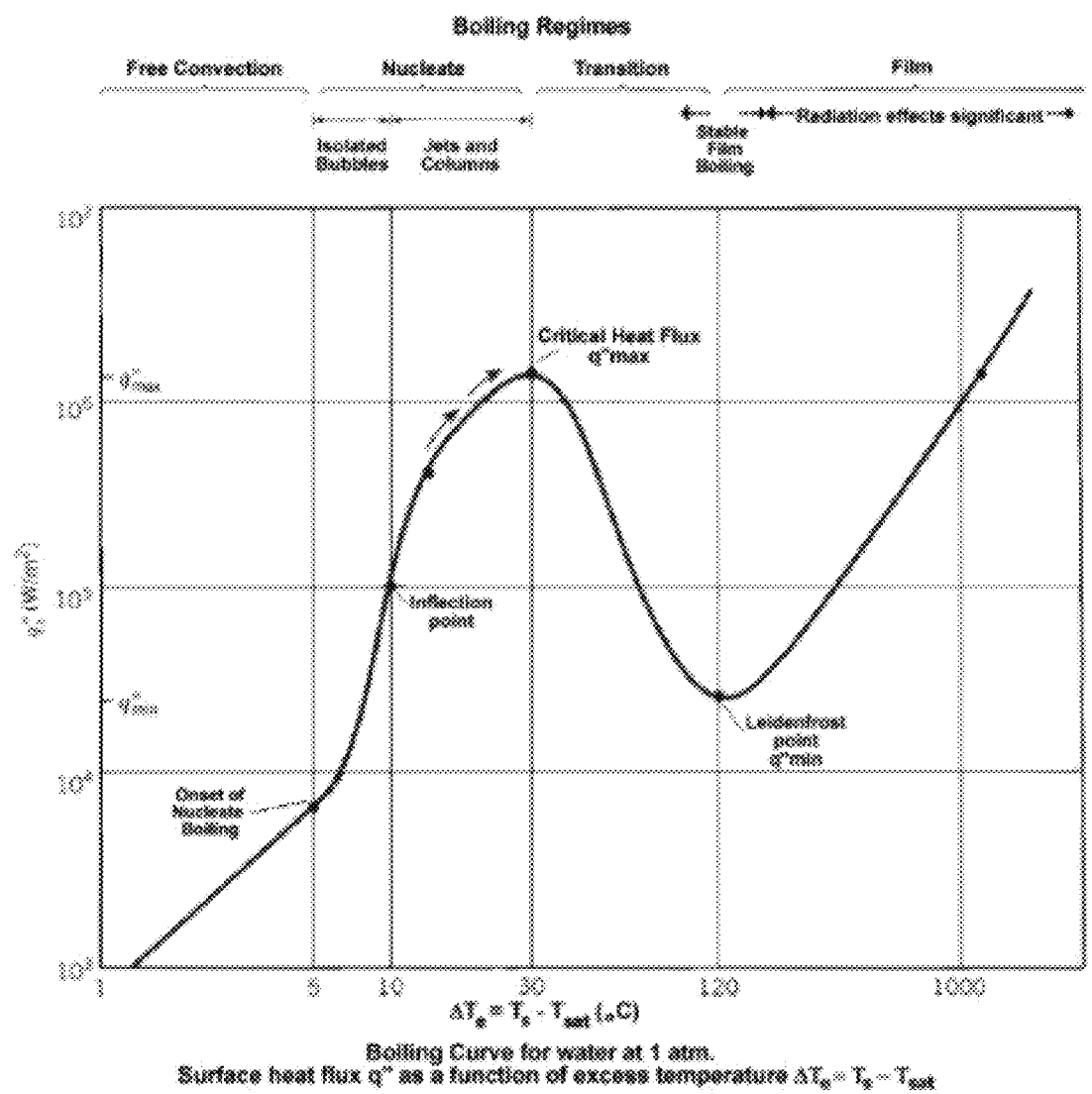
FIG. 1 illustrates an example of a boiling curve for water at 1 atm.

The algorithm first used a finite difference method to simulate pumping heat out of sphere into quenching water. Because glass can be over 1000° C. upon contact with water and the heat transfer equation was line regressed from data points, this first algorithm action was very complex. As shown in FIG. 1, the boiling regimes (free convection, nucleate, transition, and film) all have different temperature exchange profiles and regression. Thus, to find a fit for these boiling regimes required conditional tests and multiple equations. The temperature exchange within the sphere used a static thermal conductivity coefficient and the surface area of concentric embedded spheres. The cooling model was reaffirmed by the length of time measured for an actual sphere to cool in a water bath.

Next, the algorithm calculated the internal stress present at the boundaries of the concentric spheres at the time of solidification (approximately 800° C.). This was accomplished by mapping the differential cooling and associated contraction with pressure in the liquid core being fully distributed and stress in the solid shell remaining localized and only affecting the individual boundaries.

Figure 2:
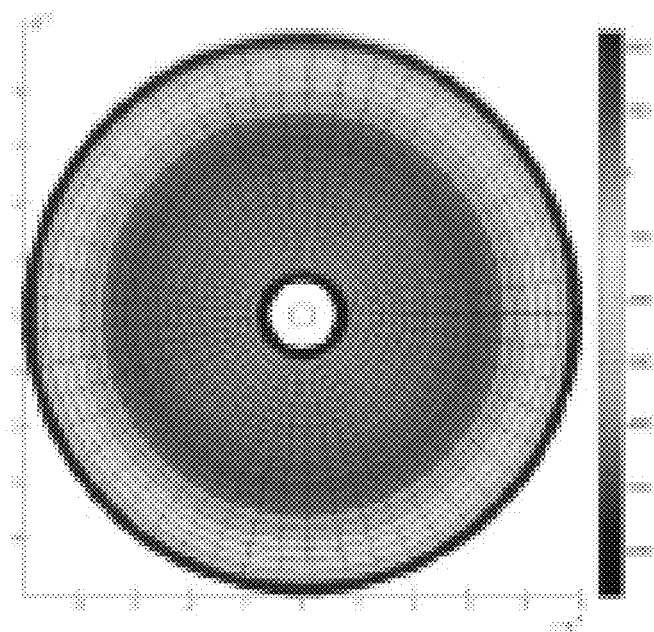
FIG. 2 illustrates an example of the internal stress present in a fully tempered glass sphere simulated by Applicant's MatLab model disclosed herein.

Usefulness of the model was realized in the selection of a more suitable glass and general visualization of the internal stresses present in a fully tempered glass sphere. Such visualization is shown, for example, in FIG. 2.

Production of Spheroids

Various components can affect the production of a spheroid. These components include, for example, the type of material used, the method of forming the spheroids, cooling the spheroids (without destruction of the spherical shape), flaw elimination (e.g., bubbles, small surface pits, and bumps, etc.), and production inconsistencies (e.g., temperature before quenching, shape after cooling, etc.).

Materials Used in Manufacturing

Spheroid Materials:

Traditionally, PRDs can be created using soda-lime glass. With its high thermal expansion and low melting temperature, soda-lime glass can easily be dripped into water to create a PRD. The spheroid materials can include glass or glass-like substances. For example, besides soda-lime glass, the spheroid material can include borosilicate glass, other glass compositions (including, but not limited to, potassium, phosphorous, alumina, or combinations thereof), fused silica, fused quartz, amorphous polycrystalline materials, fused polycrystalline materials, metals, plastics, or combinations thereof. In some embodiments, the spheroids comprise borosilicate.

Heat Sources:

Various heat sources can be used to melt the spheroid material. These heat sources include, but are not limited to, oxyacetylene torches, MAP gas torches, oxygen/MAP gas torches, propane/oxygen torches, an electric heater, a furnace, a forge, a kiln, an inductive heater, a microwave heater, or combinations thereof. In addition, various torch heads, such as rosebud tips or a welding tip, can be used.

Cooling Fluids:

During the production of the spheroids, various cooling fluids can be used during quenching of the spheroids. These cooling fluids include, but are not limited to, water, salt water solutions (e.g., sodium chloride, potassium chloride, etc.), tempering oils (e.g., mineral oils, petroleum based oils, etc.), synthetic oils, super-cooled liquids (e.g., nitrogen, helium, or inert cryogenic fluids), cryogenic gas immersion (e.g., $CO_2$, argon, helium, nitrogen, or other non-flammable/inert compressed gases) or combinations thereof.

These cooling fluids can be in a cooling environment to quench the spheroids. For example, the cooling environment can be a basin or container filled with a cooling fluid. The cooling fluid in the container can be stagnant or agitated. In addition, the container can have various depths and/or paddings on the bottom or sides. Furthermore, the container can include screens and/or tapered walls. The cooling environment can also simply be a flowing cooling fluid. The flowing cooling fluid can include screens, padding, and/or tapered walls. In addition, the cooling environment can also be a gas immersion chamber. In some embodiments, a flowing basin and an immersed tapered trough can be used in extracting spheroids from ones that shattered during tempering. Padding the walls and bottom of a static basin can help the sample from shattering during the cooling process.

Manufacturing Techniques

Single Drop Method:

One manufacturing technique used to create the spheroids is known as the single drop method. In the single drop method, an end of a spheroid material can be heated using a heat source until a portion of the spheroid material is in a molten state. In some embodiments, the spheroid material is shaped in rod form and an end of the rod is heated. In some embodiments, the spheroid material is heated to a temperature of about 600-1600° C. or about 800-1100° C. for borosilicate. Once a portion of the spheroid material is in the molten state, a drop can begin to form on the end of the spheroid material. As the drop begins to detach from the rest of the spheroid material, the heat from the heat source can be increased. For example, higher torch flow can be added at this time using a hand valve. This increase in heat can cause the tail of the drop to be wrapped into the sample as it falls, thereby helping to eliminate the tail and form a more uniform spheroid.

After the drop has fallen from the rest of the spheroid material, the drop can fall into a cooling environment containing a cooling fluid. Once in the cooling environment, the drop quenches to form a spheroid. The spheroids formed from the single drop method can have a size/diameter of between about 4 mm to 12 mm, about 5 mm to 10 mm, and about 7 mm in diameter. In addition, the compressive strength of the spheroids produced by the single drop method can be between about 250,000 psi and 550,000 psi.

Shaping Method:

A second manufacturing technique used to create the spheroids is known as the shaping method. In the shaping method, spheroid material can be added to a trough or channel that is heated by a heat source. In some embodiments, the spheroid material is heated to a temperature of about 600-1600° C. or about 800-1100° C. for borosilicate. The troughs or channels can be made out of graphite, stainless steel, brass, ceramic (crucible), or a combination thereof. Besides the material the trough/channel is made out of, the surface of the trough/channel can impact spheroid production. For example, the surface of the trough/channel can be coated or added to with any of the above materials that can be used for making the trough. The surface of the trough/channel should minimize sticking of the molten beads to the surface so that the spheroid material can be easily manipulated in the trough/channel as described below. In some embodiments, the surface of the trough/channel includes graphite. In some embodiments, the spheroid material is in the molten state when added to the trough or channel. This can be accomplished by heating the spheroid material using a heat source (as described above in the single drop method). In some embodiments, the heat source can be integrated into the trough or channel. In some embodiments, the trough or channel can be a hemispherical trough or channel. The diameter of the hemispherical trough or channel can vary depending on the desired size of the final spheroid.

Once in the trough or channel, the spheroid material can be manipulated by rolling or shaping a molten bead until a closed sphere is realized. During manipulation, the would be tail of the molten bead can get rolled into the bead, thereby eliminating the tail of the PRD. The molten beads can be evenly heated during the rolling/shaping phase. In addition, the troughs or channels can include counter sliding channels or corkscrewing channels to help shape the molten beads. For example, the shaping method can be automated and use a spiral channel around a dowel or rod to roll the beads out. In some embodiments, multiple troughs or channels can be used to roll or shape the molten beads. For example, putting one trough/channel on top of a second trough/channel and actuating the top trough/channel to roll the bead off of the lower trough/channel can be used.

After manipulation of the molten bead in the trough/channel, the molten bead can then be rolled or pushed off the trough/channel and into a cooling environment containing a cooling fluid. Once in the cooling environment, the drop quenches to form a spheroid. In addition, the compressive strength of the spheroids produced by the shaping method can be between about 250,000-550,000 psi, about 300,000-500,000 psi, and about 350,000-450,000 psi. In some embodiments, the compressive strength of the spheroids produced by the shaping method is at least about 250,000 psi, about 300,000 psi, about 350,000 psi, about 400,000 psi, about 450,000 psi, about 500,000 psi, and about 550,000 psi.

Molding Method:

A third manufacturing technique used to create the spheroids is known as the molding method. In the molding method, spheroid material can be dripped into a mold. The spheroid material can be in the molten state when it is dripped into the mold. This can be accomplished by heating the spheroid material using a heat source (as described above in the single drop method). The mold can be made out of graphite, stainless steel, brass, ceramic (crucible), or a combination thereof. In addition, the mold can include more than one piece. For example, in some embodiments, the mold is a two-piece graphite mold that can be mechanically fixed to each other. In some embodiments, the molten spheroid material can be pressed between two halves of the mold.

The mold can be heated when the molten spheroid material enters the mold. A heat source can provide the heat to the mold. In some embodiments, once the molten spheroid material is in the mold, the temperature of the mold can be increased. As the mold is heated, a continuous pressure can be applied to the mold. For example, a continuous tightening force on a two-piece mold can be applied. The temperature of the mold can be checked before the quench with, for example, an IR pyrometer. After the molten spheroid material is in the mold for a set amount of time, the entire mold can be immersed in a cooling environment containing a cooling fluid. After cooling, the spheroid can be retrieved from the mold. In addition, the compressive strength of the spheroids produced by the molding method can be between about 250,000-550,000 psi, about 300,000-500,000 psi, and about 350,000-450,000 psi. In some embodiments, the compressive strength of the spheroids produced by the molding method is at least about 250,000 psi, about 300,000 psi, about 350,000 psi, about 400,000 psi, about 450,000 psi, about 500,000 psi, and about 550,000 psi.

The molding method may be capable of reproducing the most consistent spheroids at the highest rate. The molding method can also be capable of producing spheroids with high level of symmetry. However, some of these spheroids could be ellipsoid like a "tic-tac". This can most likely be because of uneven cooling due to the planar shape of the molds (and different thermal conductivity orthogonal to the grain in the graphite molds) and/or because of a mismatched coefficient of thermal expansion (CTE) between the spheroid material and the mold. Besides immersing the mold into a cooling environment, another type of cooling such as forced coolant injection can affect the symmetric cooling of the spheroids.

Other Methods: Other methods can be used to create the spheroids. For example, stainless steel hot-end dripping, graphite active-shaping geometry, brass active-shaping geometry, tungsten active-shaping geometry, inductive heating in already molten state, ultrasonic levitation, low gravity manufacture, free fall chamber with vectored updraft.

Testing

Spheroid Characterization:

Deviation of the spheroids from ideal was determined by using an underlain grid and tracing deviation from the expected spherical intersection points. No precision measurements were taken, and samples were categorized by having all points of intersection within the error of the observer using a digital microscope. Samples having significant but highly symmetrical deviation were categorized as either ellipsoid or ovoid. Non-defined spheroid shapes with nodular surfaces or protrusions were all placed in a "reject" sample collection, but tested against passing geometries none the less.

Hardness Test:

The hardness of the spheroids was tested using a Mohs Scale Test Kit. Using the Mohs Scale Test Kit, consisting of different tipped picks, the surfaces of the spheroids were barely scratched. Using borosilicate spheroids produced methods described above, Applicants discovered that the hardness of the borosilicate spheroids is in the high 6 range, close to 7. This compares favorably to the accepted hardness of 5.5 of untreated borosilicate, implying that the method used to create the spheroid had a significant effect on surface hardness. Furthermore, Borosilicate glass measured before and after the tempering process showed a delta increase of at least 0.5 on the Mohs scale scratch test. In addition, the Mohs Hardness Scratch Tests could be converted to Rockwell hardness (HRA). In contrast to the unscratched spheroids, scratched spheroids were easily broken with hammers or pliers when pressure was applied. As such, scratching of the surface of the spheroid appears to weaken the overall particle similar to that of breaking the tail of a traditional PRD.

Compressive Stress Test:

A 20-ton hydraulic shop press, a section of ¾" diameter steel rod, 1½ steel bars, two 2-ton load cells, and copper foil were used to test compressive stress. The load cells were rigged in parallel in order to withstand the pressure applied and calibrated using 50 lbs weight before each measurement session and verified after testing was completed. The load cells were legal for trade but carried no laboratory designation. An image of the full set up can be seen in FIG. 3. A slight divot was bored into a 2 inch 316 alloy stainless steel rod approximately 2.5" tall, which was then covered by a thin layer of copper foil to act as a pad and keep the spheroid from being scratched. The top anvil used in the press was a carbon steel rod, approximately ¾ inch by 2 inches tall that had been dented slightly by a spheroid during a preliminary test and was subsequently heat treated. The dent on the steel rod was also covered by the copper foil.

Figure 3:
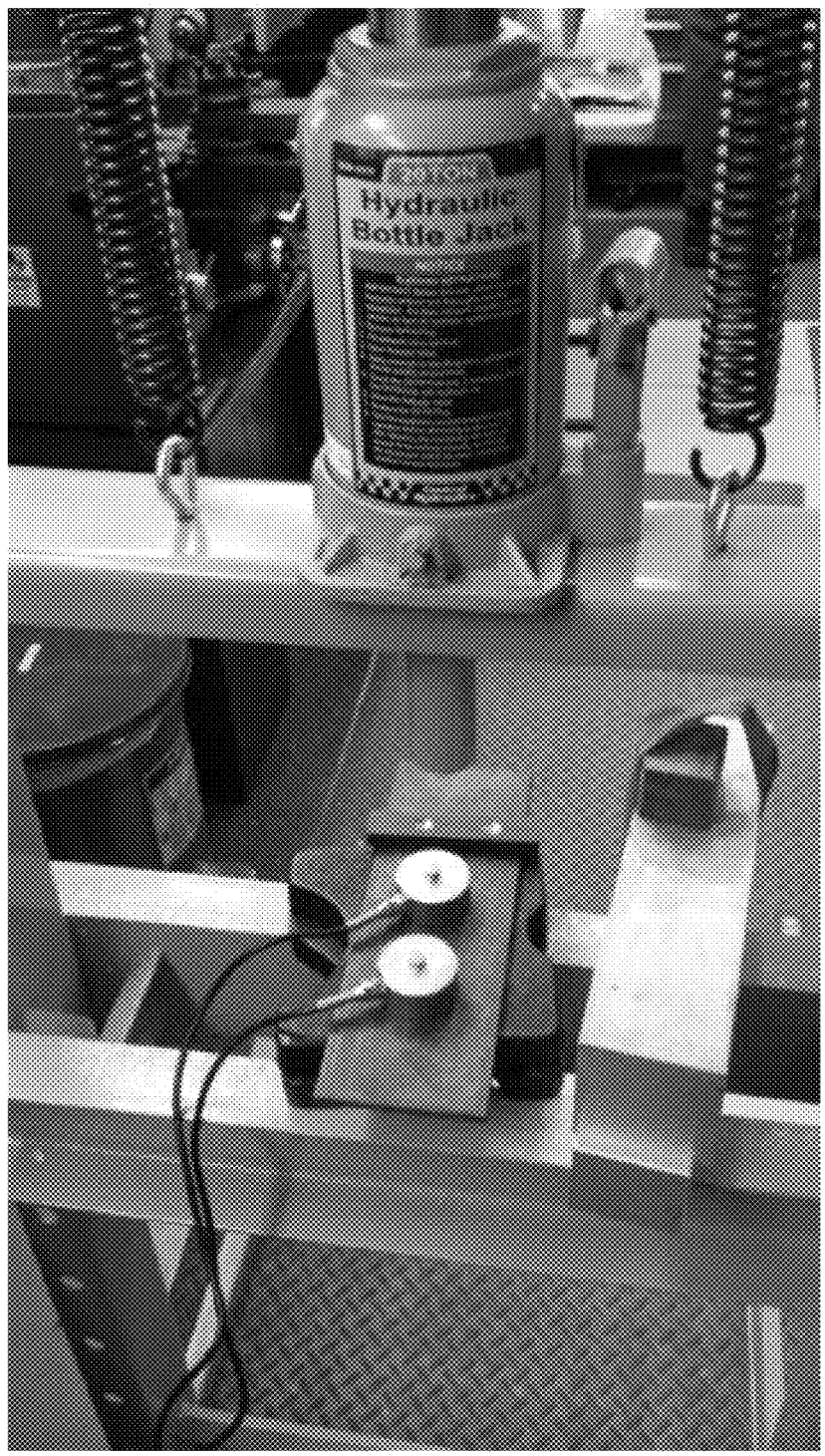
FIG. 3 depicts a set up used to measure compressive stress.
Figure 4:
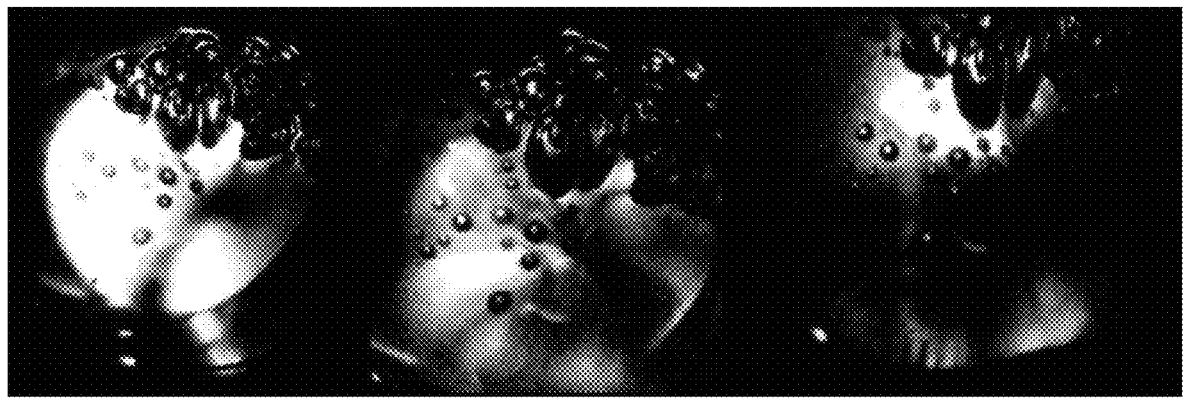
FIG. 4 illustrates an image through a polarized lens of a borosilicate spheroid at three different stages of compression by the hydraulic press.

The bottom anvil was placed on a jig halfway between the two load cells, and the spheroids undergoing the test were placed on a stainless steel cradle upon the load cells as shown in FIG. 3 and secured between the two anvil heads. The data recording software from the load cells was then activated. The pressure was slowly increased until the spheroid shattered (usually into a very fine dust and what appeared on slow motion camera to be tiny spindles of molten glass ejected from the energetic failure). FIG. 4 illustrates an image through a polarized lens of a borosilicate spheroid at three different stages of compression by the hydraulic press. As shown in FIG. 4, the redistribution of internal stress as more pressure is applied can be seen, and the "banding" of colors in the final image likely represents a point load where ultimate failure took place.

After the particle shattered, the copper foil was collected from the anvils and the contact indentation in the copper foil (or the steel itself if no copper foil was used) was measured using digital calipers to estimate a linear approximation of the surface area by which the pressure could be determined from the total force applied to the load cells, usually between 1500-2500 pounds, depending on the individual spheroid, contact, area, manufacture technique, etc.). Poor samples usually failed between 50 and 700 pounds. Few were in between, which gave a good indication of whether a spheroid had been properly tempered without structure inconsistencies.

The data recording software included with the load cells provided an accurate value for the equivalent weight applied to the spheroids by the hydraulic press. The highest value recorded before failure was assumed to be the maximum weight each spheroid could withstand before breaking. After converting the recorded weights to force in Newtons and converting the measured surface areas to the appropriate units, the pressure applied to each drop was calculated using: $P=F/A$. As shown in FIG. 3, Visualization of Internal Stress/Strain Test:

The internal stress and strain of the spheroids can be visualized by polarized lenses.

Test Results

Although there was a high deviation in the tested sample strengths, higher temperature spheroids that cooled without fracturing and without high levels of gaseous inclusions were more sought after during manufacturing and seemed to yield better strength results. The following Table 1 includes data obtained from borosilicate spheroids created using the shaping method described above.

TABLE 1

| Drop | Mass (g) | Surface Area (mm^2) | Weight (kg) | PSI | Comments |
|---|---|---|---|---|---|
| 1 | 0.44 | 3 | 619 | 133118.2796 | No copper |
| 2 | 0.41 | 3 | 987 | 212258.0645 | No copper |
| 3 | 0.41 | 3 | 1091 | 234623.6559 | No copper |
| 4 | 0.36 | 3 | 869 | 186881.7204 | No copper |
| 5 | 0.5 | 3 | 1039 | 223440.8602 | No copper |
| 6 | 0.52 | 3 | 2477 | 532688.172 | No copper |
| 7 | 0.38 | 3 | 1496 | 321720.4301 | No copper |
| 8 | 0.05 | 2 | 1087 | 350645.1613 | No copper |
| 9 | 0.46 | 3 | 1996 | 429247.3118 | |
| 10 | 0.4 | 3 | 2187 | 470322.5806 | |
| 11 | 0.48 | 3 | 1748 | 375913.9785 | |
| 12 | 0.47 | 3 | 1288 | 276989.2473 | |
| 13 | 0.41 | 3 | 2047 | 440215.0538 | |
| 14 | 1 | 5 | 4207 | 542838.7097 | Traditional Drop |
| 15 | 0.71 | 5 | 3685 | 475483.871 | |
| 16 | 0.48 | 3 | 632 | 135913.9785 | |
| 17 | 0.58 | 3 | 2017 | 433763.4409 | |

The following Table 2 includes data obtained from borosilicate spheroids created using the mold method described above.

TABLE 2

| Batch 1 | Mass (g) | Radius (mm) | lbs | Surface Area (mm^2) | PSI |
|---|---|---|---|---|---|
| 1 | 0.71 | 10 × 7 | 1357.6 | 0.87123556 | 1027293.578 |
| 2 | 0.7 | 9.8 × 7.1 | 3097.22 | 2.0625 | 990002.8273 |
| 3 | 0.68 | 9.85 × 6.98 | 2069.44 | 6.1544 | 221679.4611 |
| 4 | 0.7 | 9.92 × 7 | 2352.55 | 4.90625 | 316116.7625 |
| 5 | | | | 0 | 0 |
| 6 | | | | 0 | 0 |

| Batch 2 | Mass (g) | Radius (mm) | lbs | Surface Area | PSI |
|---|---|---|---|---|---|
| 1 | 0.53 | 7.35 × 7.46 | 2727.56 | 11.0112 | 163304.4424 |
| 2 | 0.49 | 7.57 × 7.6 | 2752.14 | 7.446824 | 243645.1496 |
| 3 | 0.5 | 7.52 × 7.62 | 3389.02 | 3.396224 | 657864.0316 |
| 4 | 0.52 | 6.7 × 8.3 | 3494 | 8.54865 | 269453.4206 |
| 5 | 0.47 | 7.42 × 7.56 | 3580.03 | 6.60185 | 357502.7201 |
| 6 | 0.52 | 7.1 × 8.3 | 3410 | 5.084 | 442188.2256 |

| Batch 3 | Mass (g) | Radius (mm) | lbs | Surface Area | PSI |
|---|---|---|---|---|---|
| 1 | 0.47 | 7.1 × 6.9 | 467 | 0 | 0 |
| 2 | 0.45 | 7.2 × 6.88 | 1255 | 0 | 0 |
| 3 | 0.44 | 7.06 × 6.85 | 339 | 0 | 0 |
| 4 | 0.48 | 7.1 × 6.8 | 923 | 0 | 0 |
| 5 | | | | 0 | 0 |
| 6 | | | | 0 | 0 |

It should be noted that Batch 3 yielded such poor results that complete measurements were not taken. It is believed that this could be due to overheating the borosilicate in the batch to the point where the spheroids could not withstand the thermal shock once dropped in the cooling fluid and caused stress fractures that could be seen in the drops.

Figure 5:
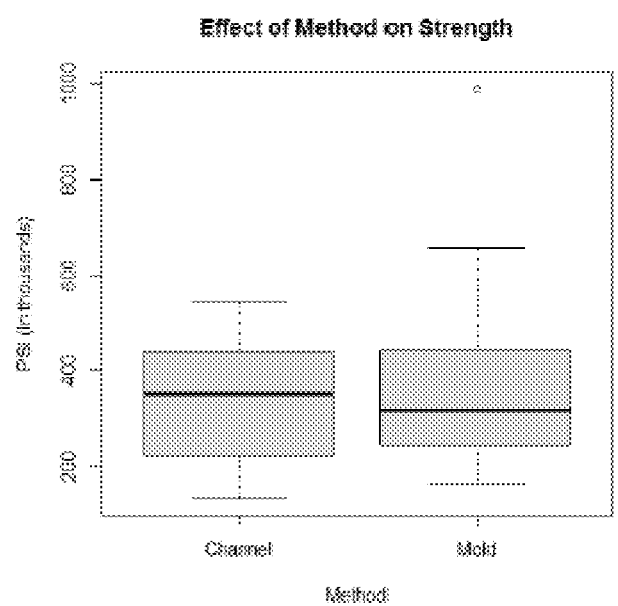
FIG. 5 illustrates a comparative boxplot of the effect the manufacturing techniques disclosed herein has on the strength of the spheroids.
Figure 6:
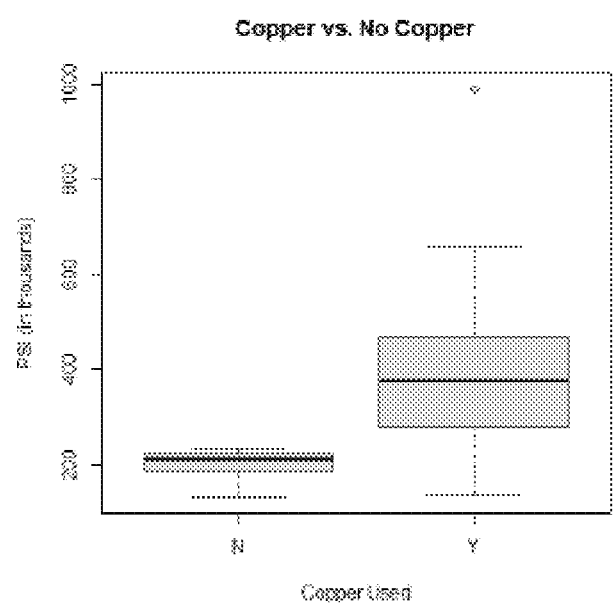
FIG. 6 illustrates a comparative boxplot of the effect scratches on the surface of the spheroids have on strength.

FIGS. 5 and 6 are comparative boxplots using the data from Tables 1 and 2. As shown in FIG. 5, there does not appear to be a statistically significant difference in compressive strength in the results between producing spheroids using the shaping method or particles using the mold method. As shown in FIG. 6, there is a significant difference in compressive strength when using a copper cushion affixed to the stainless steel as opposed to no copper. Such results appear to confirm the theory that the shear stress created by the stainless steel, which is a harder material than the borosilicate spheroids created, scratches the surface of the spheroids and significantly weakens them.

Considering even a 10% error due to non-scientific measuring apparatuses, the borosilicate spheroids created are still an order of magnitude more than standard tempered glass, which can withstand compressional force of approximately 24,000 psi versus the calculated 250,000-450,000 psi for the spheroids. Testing of manufactured borosilicate glass spheroids of high spherical geometry, planar & axial symmetry ("tic-tac", egg), non-symmetrical semi-spherical shapes of various sizes ranging from 3 mm to 2 cm in diameter with and without gaseous inclusions at varying distributions all showed significantly increased resilience to applied pressure and surface scratching when properly tempered. Non-symmetrical geometries with high inclusion rates showed the least benefit over untampered glass, with highly symmetric and near ideal spherical geometries performing similarly at the highest resilience to compressive stress. Other materials besides borosilicate were not tested across the broad geometry spectrum, but other materials did show increased resilience to compressive stress in a few samples, leading to the belief that the properties measured in borosilicate are likely to exist in many other materials strengthened by high symmetry internal stress/strain.

The tempering process produces a structure within the spheroid that is characterized by high compressive stress solidified in the near surface during the phase change from liquid to solid, followed by a prolonged cooling of the core which results in extreme tensile strain of increasing force/volume as the center is approached. The resulting resilience appears to be caused by the dynamic internal stress/strain interplay and by allowing significantly more deformation before material failure than seen in identical materials without the internal stress/strain either by having been annealed after tempering, or allowed to cool slowly after shaping). It appears that the high compression of the surface regions is what causes the material to score higher on the hardness/scratch test.

Applications

The spheroids disclosed herein can be used in a wide variety of applications. For example, the spheroids can be used in high hardness/low deformation bearings, especially where non-metallic/non-porous materials are useful (e.g., medical facilities, lab, etc.).

In addition, when the spheroids are laid in close proximity and layered into a planar configuration (utilizing a close sphere packing matrix), the aggregation of the spheroids and subsequent layers acts in a novel way when encountering stress. As wide scale pressure is applied, the spheroids share the load and can even be flexible to shear motion over a large area. However, when a large point load is applied, the spheroids in direct contact with the force are pushed into the subsequent layers, which revector much of the force along the plane of the second layer, sharing that compression among a large number of spheroids. By the third and fourth rows, the attenuation is so significant that this has potential in ballistic shielding applications. It is reminiscent of a shear/stress thickening non-Newtonian fluid, but on a macroscopic scale. For example, in one test, a ¼ inch ball-bearing (metallic but of similar characteristics to the spheroids described herein) matrix three layers deep was compressed between two ⅛ inch polycarbonate sheets and impregnated with epoxy. After being left overnight to cure, the sample was tested against a 4-10 shotgun slug. Two rounds were stopped, the second entering the ball matrix where the first had punched through the polycarbonate. A third round shattered the whole assembly and obstructed further testing. Upon inspection, it was discovered that the epoxy had not set, and had remained in a liquid state. As such, the idea that the revectoring of forces by the balls significantly dampens penetrating forces, and that the balls do not have to be rigidly interlocked, but can be in a free, but close-packed matrix.

Accordingly, the spheroids disclosed herein can be repurposed into a planar arrangement as described above and made into a flexible, thin, lightweight body armor using ceramics and fiber; point load dampening on loading docks (or other industrial settings); car/drive impact safety systems; and other aircraft/ship/structural constructions and engineering settings. In addition, because many of the materials described herein are transparent, a novel approach to impact resistant view panels seems plausible. In addition to, and perhaps the superlative utility of the spheroids disclosed herein lies in both the extreme elasticity and non-porous structure. Many fields currently using hard, non-metallic bearings rely on ceramics. Ceramics are often sintered and thereby a naturally porous material. In products where non-deforming/non-wearing bearings are required, the spheroids disclosed herein may achieve the desired characteristics with much less material cost and more favorable properties. Being an amorphous solid, there is no porosity, as seen in ceramics, which provides an upper hand to ceramics in biologically sensitive environments. For example, medical and laboratory bearings that are exposed to biological material and microbial reproduction can be problematic.

This application discloses several numerical ranges in the text and figures. The numerical ranges disclosed inherently support any range or value within the disclosed numerical ranges even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A method of making a glass spheroid comprising:
heating a spheroid material until a drop of melted spheroid material detaches from the rest of the spheroid material;
adding the drop of melted spheroid material to a first evenly heated channel;
actuating the first evenly heated channel and a second evenly heated channel in a countersliding manner, such that the drop of melted spheroid material is rolled between the first evenly heated channel and the second evenly heated channel until the drop of melted spheroid material is shaped into a closed sphere comprising the melted spheroid material;

actuating at least one of the first evenly heated channel and the second evenly heated channel to roll the closed sphere into a cooling environment comprising a cooling fluid consisting of flowing water and an immersed tapered trough, thereby forming a glass spheroid having a compressive strength of at least 250,000 psi; and extracting the glass spheroid using the immersed tapered trough.

2. The method of claim 1, wherein the spheroid material comprises soda-lime glass or borosilicate glass.

3. The method of claim 2, wherein the spheroid material comprises borosilicate glass.

4. The method of claim 1, wherein the heated channel is a hemicylindrical heated channel.

5. The method of claim 1, wherein the first heated channel and the second heated channel comprise graphite, stainless steel, brass, or ceramic.

6. The method of claim 5, wherein the first heated channel and the second heated channel comprise graphite.

7. The method of claim 1, wherein the glass spheroid has a compressive strength between 250,000 psi and 550,000 psi.

8. The method of claim 1, wherein the glass spheroid has a diameter between 4 mm to 12 mm.

* * * * *